United States Patent
Saw

(10) Patent No.: US 6,385,241 B1
(45) Date of Patent: May 7, 2002

(54) METHOD AND APPARATUS FOR VIDEO RATE CONTROL USING A RADIAL BASIS FUNCTION RATE ESTIMATOR

(75) Inventor: Yoo-sok Saw, Seoul (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/018,339

(22) Filed: Feb. 4, 1998

(30) Foreign Application Priority Data

Feb. 20, 1997 (KR) ............................................. 97-5207

(51) Int. Cl.$^7$ .............................. H04N 7/12; H04N 5/14
(52) U.S. Cl. ............................. 375/240.03; 375/240.03
(58) Field of Search ................................ 348/699, 700, 348/419, 403, 405, 415, 417, 418; 382/232, 233, 236, 238, 239, 251, 253; 375/240.2, 240.03, 240.19; 358/136; H04N 7/12, 5/14, 9/64

(56) References Cited

U.S. PATENT DOCUMENTS

| | | | | |
|---|---|---|---|---|
| 4,125,861 A | * | 11/1978 | Mounts | 375/240.12 |
| 5,136,377 A | * | 8/1992 | Johnston et al. | 358/136 |
| 5,602,594 A | * | 2/1997 | Cho et al. | 375/240.05 |
| 5,801,779 A | * | 9/1998 | Uz et al. | 348/419 |
| 5,870,145 A | * | 2/1999 | Yada et al. | 348/405 |
| 5,973,754 A | * | 10/1999 | Panis | 348/699 |

OTHER PUBLICATIONS

Nonlinear predictive rate control for constant bit rate MP video coders, Saw, Y.–S; Grant, P.M.; Hannah, J.M.; Mulgrew, B.Acoustics, Speed, and Signal Processing, 1997. ICASSP–97., 1997 IEEE International Conference; pp. 2641–2644 vol. 4, Apr. 1997.*

Radial basis function video rate estimator for constant bit rate MPEG coders, Electronics Letters, Yoo–Sok Saw, P. M. Grant, J.M. Hannah and B. Mulgrew, Oct. 1996.*

* cited by examiner

Primary Examiner—Nhon T Diep
(74) Attorney, Agent, or Firm—Fleshner & Kim, LLP

(57) ABSTRACT

Video rate control and buffering based on a rate estimator and scene change features has been investigated for constant bit rate channels. A scene change-based, predictive technique has been applied so that the buffer occupancy may be controlled effectively in advance of encountering a dramatic variation in the video rate. The current occupancy and the future occupancy, has been used to control the quantization step size to provide substantial improvements in the video rate control. A non-linear rate estimator based on the RBF network which has better performance in terms of the buffer occupancy is also provided.

7 Claims, 5 Drawing Sheets

METHOD AND APPARATUS FOR VIDEO RATE CONTROL USING A RADIAL BASIS FUNCTION RATE ESTIMATOR

BACKGROUND OF THE INVENTION

The present invention relates to a method for controlling video rate by feed-forward, estimator-based rate control scheme assisted by scene change detection for MPEG video encoder and an apparatus therefor.

Video rate management has been a challenging technical task in the field of video communication to ensure that the utilization of the transmission media is maximized and that the service delivers the required level of video quality regardless of the input video traffic. The necessity for video rate control arises particularly in the constant bit rate (CBR) applications which transmit a wide range of rapid motion videos via a fixed rate channel. MPEG phase 1 and 2 have been established for the CBR transmission of variety of videos such as movies, sports, as well as for variable bit rate (VBR) communication.

For VBR MPEG transmission, modeling of the compressed video appears as the core task to be tackled since its statistical properties provide a sound base for a strategy to establish an optimum effective bandwidth allocation. Much research work has been performed for establishing a optical model of the compressed video.

For CBR MPEG transmission, buffering—which stores the compressed video in a first-in-first-out buffer for a specified period of time—is widely used to adapt the variable-bit-rate video to a fixed rate channel. In the buffering, the quantiser is the core function which control the video rate.

Concerning MPEG video rate control, the MPEG standards do not specify the details of the rate control process since they depend entirely on a specific design. MPEG 2 Test Model specifies the detail and is developed as a performance benchmark.

FIG. 1 is a block diagram showing a general video rate controller of the MPEG. In FIG. 1, encoder 2 encodes a quantised video by variable length coding method. Buffer 3 stores the compressed and quantized video signal to smooth bursty compressed video. The occupancy measures the portion of the buffer capacity which is filled by the compressed video data awaiting transmission. The occupancy value(O) is input to a buffer/quantizer regulator 4. The buffer/quantizer regulator 4 determines a quantization step size(Qs) according to the buffer occupancy. The larger value of the buffer occupancy, the larger value of the quantisation step size is determined. The occupancy value of the specific time point informs a quantizer 1 of which step size should be taken for the next encoding operation. The quantizer 1 quantises the DCT video signal according to the quantisation step size(Qs).

In TM5 the rate control algorithm is based on one-step ahead estimation using a picture complexity measure. It consists of three steps: firstly estimating the target number of coded bits and a mean quantization scale for the previous picture; secondly calculating the quantization step size for a whole picture, (base on the current buffer occupancy); and finally, local adaptation of the framewise quantization step size is obtain for a single macro block using a normalized activity in the macro block. In the bit allocation process, bits are allocated to each type of picture (I, P and B picture) in compliance with the approximate ratio of I:P:B=8:3:2, if the input video stationary, i.e. if the scene change features of adjacent pictures are similar. The buffer occupancy is calculated by subtracting the actual number of coded bits from the estimated target bits. Hence, the rate control process of TM5 is considered to directly exploit similarities in the video. However, if the video is not stationary, the number of target bits will differ significantly from the actual coded bits. Likewise, the activity changes in the macroblock often have a large variation if a picture has a large amount of details inside it. This may cause large fluctuations in the occupancy and in the quantization value. Therefore, if there is a rapid scene change in the incoming video, high occupancy or overflow may occur. The case of buffering malfunction is overflow when a dramatic increase in the video rate cannot be accommodated in the finite length buffer.

SUMMARY OF THE INVENTION

To solve the above problems, it is an object of the present invention to provide a MPEG video rate control method and apparatus therefor using predicting the future occupancy, i.e. by estimating the video rate for the next picture in order to smooth the video rate without introducing noticeable quality degradation.

To accomplish the above object of the invention, there is provided a method for controlling MPEG video rate, which comprise the steps of:

(a) calculating three values for the scene change features for the input video which are intra-frame variance, inter-frame variance, and picture type value;

(b) estimating a video rate by taking the three values of the scene change feature using a radial basis function (RBF);

(c) estimating a buffer occupancy by the estimated video rate cbfe(k), the current buffer occupancy O(k−1,1), and MBF(means bits per frame);

(d) determining a quantization step by a non-linear mapping curve which is determined by the current and the estimated buffer occupancy; and (e) quantizing the DCT video input using the quantization step size which is determined in the forth step and encoding a quantized video, thereby output a video rate as a result of the compression.

There is a also provided an apparatus for controlling MPEG video rate, which comprises;

scene change calculating means to estimate the intra-frame variance, inter-frame variance, and picture type value of an input video;

video rate estimating means for estimating a video rate of the next frame by taking three scene change features using radial basis function(RBF);

buffer occupancy estimating means for estimating a buffer occupancy of the next frame using the estimated video rate of the said video rate estimating means, the current buffer occupancy, and MBF(means bits per frame); and quantization step size determining means for determining a quantization step size Qs non-linearly with input of the estimated buffer occupancy of said buffer occupancy estimating means and the current buffer occupancy.

DETAILED DESCRIPTION OF THE PREFERRED EMBODIMENT

Preferred embodiments of the invention will be described below in more detail with reference to the accompanying drawings.

Figure 1:
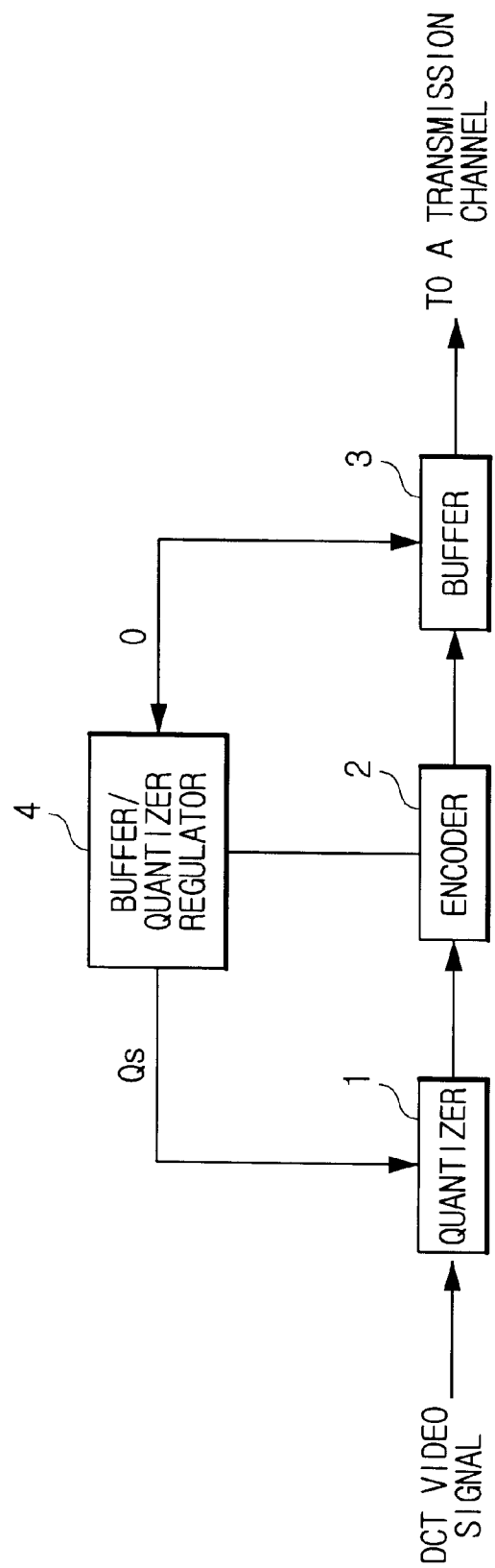
FIG. 1 is a block diagram showing a general video rate controller for MPEG.
Figure 2:
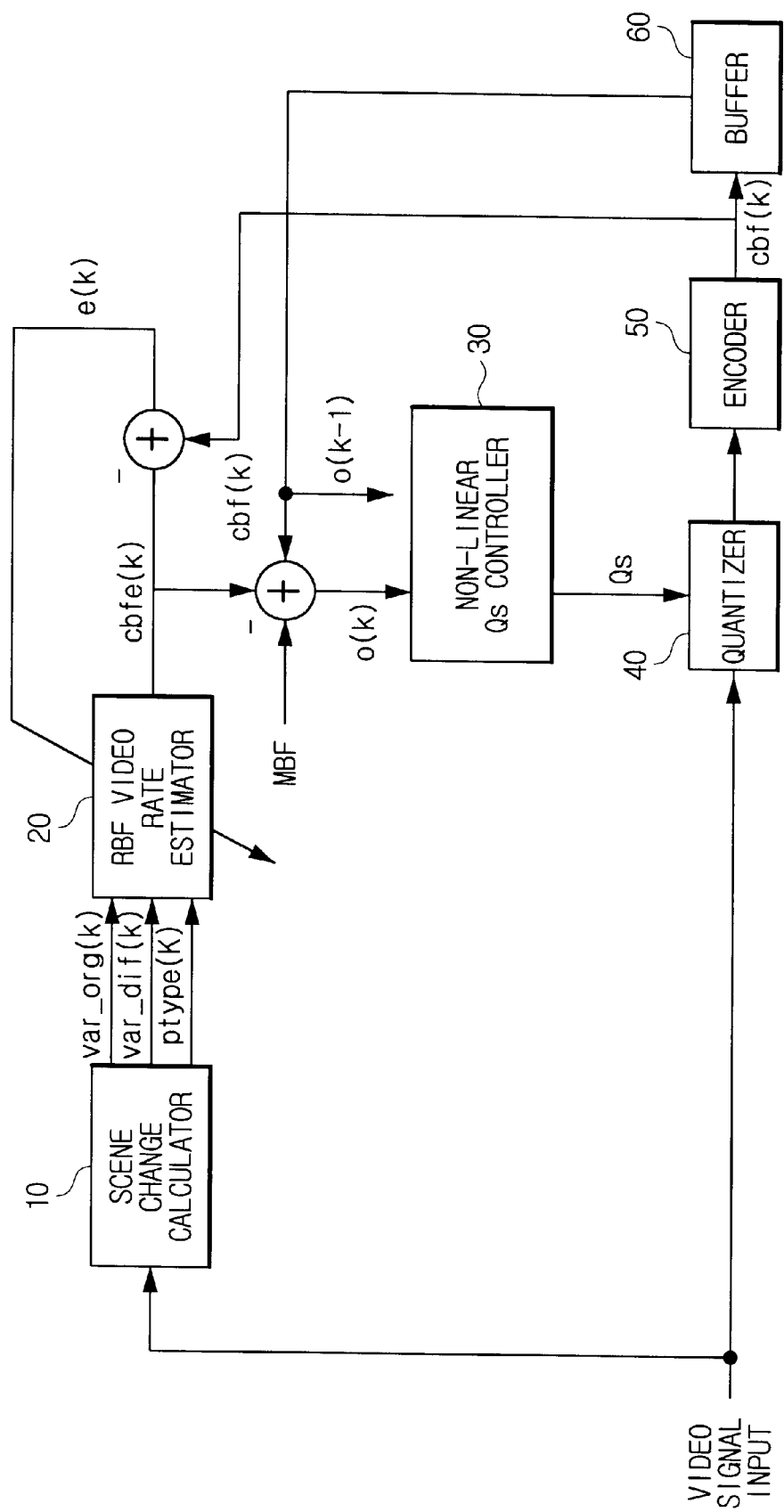
FIG. 2 is a block diagram illustrating a MPEG video rate controlling apparatus according to the embodiment of the present invention.

FIG. 2 is a block diagram illustrating a MPEG video rate controlling apparatus according to the embodiment of the present invention. As shown in FIG. 2, the apparatus comprises; quantizer 40, encoder 50, buffer 60, scene change calculator 10, RBF video rate estimator 20, and non-linear Qs controller 30.

The quantizer 40 quantizes the DCT video signal according to a quantization step size(Qs) and the encoder 50 encodes a quantized video by variable length coding method. The encoder 50 also output a video rate as a result of the compression. A buffer 60 stores the compressed and quantized video signal to smooth bursty compressed video and output the current buffer occupancy O(k−1). The above functions of the quantizer 40, encoder 50 and buffer 60 are similar to these of the prior art. So, the characteristics of the present invention reside in another portion of the apparatus in FIG.2; a scene change calculator 10, RBF video rate estimator 20, and non-linear Qs controller 30.

The scene change calculator 10 estimate the scene change for the input video signal. The scene change calculator 10 outputs three features to indicate frame-by-frame scene changes as inputs for the rate predictor. Three features for kth frame are two variances var_org(k), var_dif(k) and one picture type information ptype(k). They represent 1st order features of scene change, i.e. intra-frame variance, inter-frame variance, and picture type value. The variance, var_org(k) and var_dif(k) represent the variance within the input picture and variance between the current picture and the previous picture, respectively. The picture type information, ptype(k) has a single value according to the input picture(I, B,P).

The RBF video rate estimator 20 outputs the estimated rate value cbfe(k) by taking three scene change features at every frame start. The estimated rate value cbfe(k) which will be compared to the actual rate value cbf(k) after completing the encoding of kth frame to evaluate an error e(k). The performance of the rate estimator depends entirely on the relevance of the scene change features to the video rate. If the scene change features have a certain linear or a non-linear relationship with the video rate, the video rate can be estimated by an estimator having adequately selected inputs.

In this embodiment, the video rate is estimated by non-linear prediction using a radial basis function(RBF) network. The RBF network is known to have better prediction performance than linear predictors and has recently been used successfully in several engineering areas such as channel equalization. It is also classified as a neutral network with a single hidden layer, however, here it is considered as a predictor with a non-linear function.

The RBF consists of centers with a radial basis function and linear weights defined as expressed in the following equations:

$$F(x) = \sum_{i=1}^{N} \omega_i \phi(\|x - x_i\|) \quad (1)$$

$$\phi(r) = \exp\left(-\frac{r^2}{2\sigma^2}\right)$$

where F(x) is the output of the RBF network, $\omega_i$ is the linear weight, x is an input vector. In equation (1), $\phi(\ )$ is a Gaussian function which outputs hidden layer values.

Figure 3:
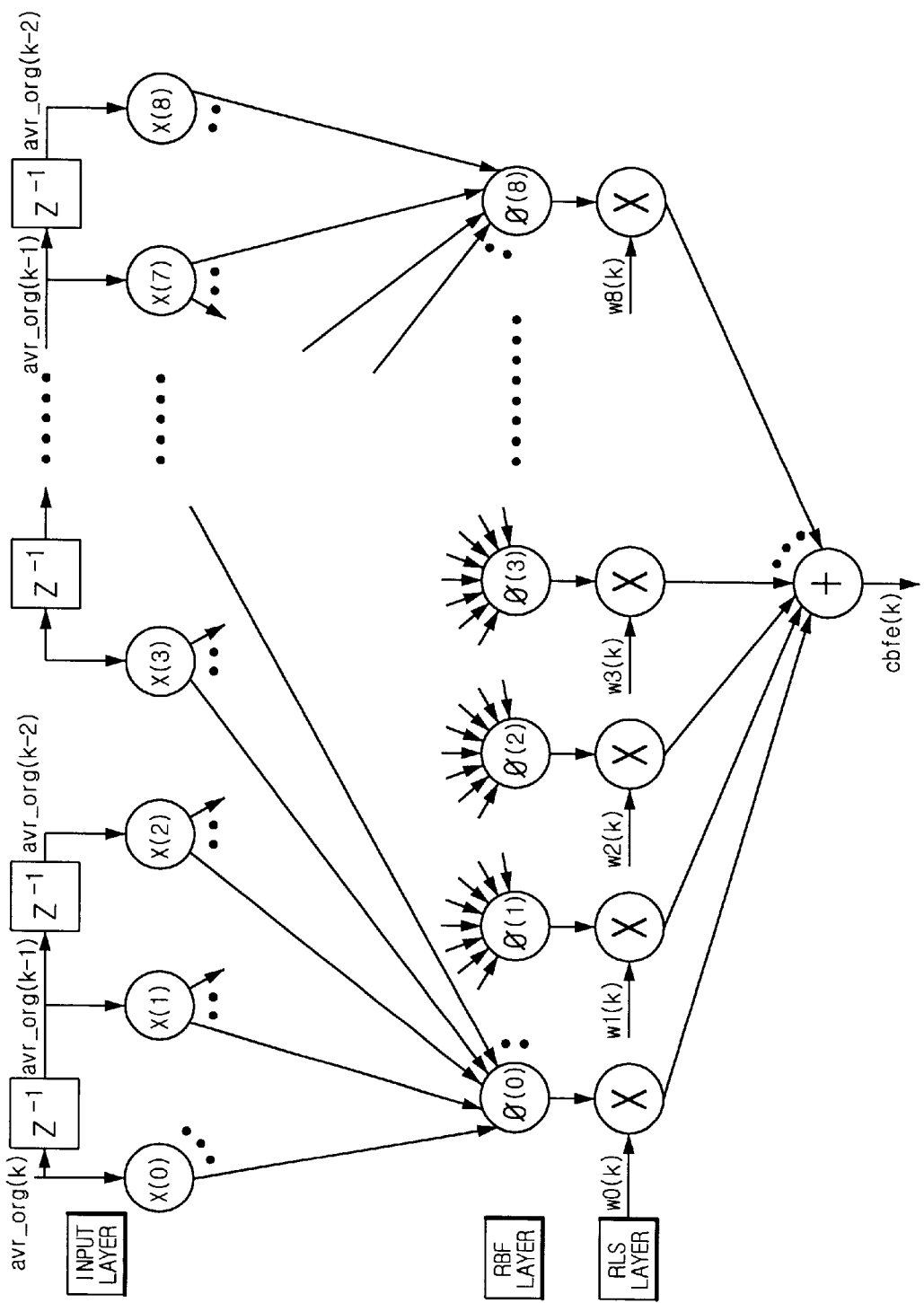
FIG. 3 is a view for explaining the function of the RBF network.

FIG. 3 is a view for explaining the function of the RBF network. The RBF network, may take as many inputs as necessary for centers, and it calculates the contribution of each input using a specified non-linear function. For computational efficiency, however, the RBF centers are usually selected by an orthogonal least square(OLS) algorithm. Here, we used 8 to 10 centers for the rate estimator 20, FIG. 3 shows a case of 9 centers for simplicity. The RBF network as shown in FIG. 3, consists of three layers; an input layer, a RBF layer, and a Recursive Least Squares(RLS) layer. The input layer puts two delays for each scene feature input, whereby 9 data are input for each frame. The RBF layer calculate the center and Euclidean distance of every input vector which is composed of 9 data. Hence, the layer RBS output 9 data to the RLF layer, for each scene change feature input. Each output of the RBF layer is multiplied by RLS filter weight $\omega^*(k)$, and the summation of all the result of the multiplier is, the estimated video rate cbfe(k) which is the output of the video estimator 20.

After completing the encoding the kth frame, video rate of the kth frame cbf(k) is subtracted from the estimated video rate cbfe(k), resulting in an error e(k). The linear weights $\omega(k)$ is updated with e(k) in the RLS algorithm to produce the linear weights of the next frame $\omega^*(k+1)$.

The estimated buffer occupancy is determined by the estimated video rate cbfe(k), the current buffer occupancy O(k−1,1), and MBF(means bits per frame) as shown in an equation (2) below.

$$O(k) = O(k-1) + cbfe(k) - MBF \quad (2)$$

The current buffer occupancy O(k−1,1) and the estimated buffer occupancy O(k,1) are input to the non-linear Qs controller 30.

The non-linear Qs controller 30 determines the quantisation step Qs regarding buffer occupancy inputs to adjust the video rate. The non-linear Qs controller 30 uses both the current and the estimated buffer occupancy to select a mapping curve for quantisation scale. It changes between linear and non-linear curves depending on the estimated buffer occupancy. If a dramatic change in the occupancy is estimated, then it makes a mapping curve more non-linear, otherwise, it selects a more linear one. The final quantisation step value is determined by the current buffer occupancy.

Figure 4:
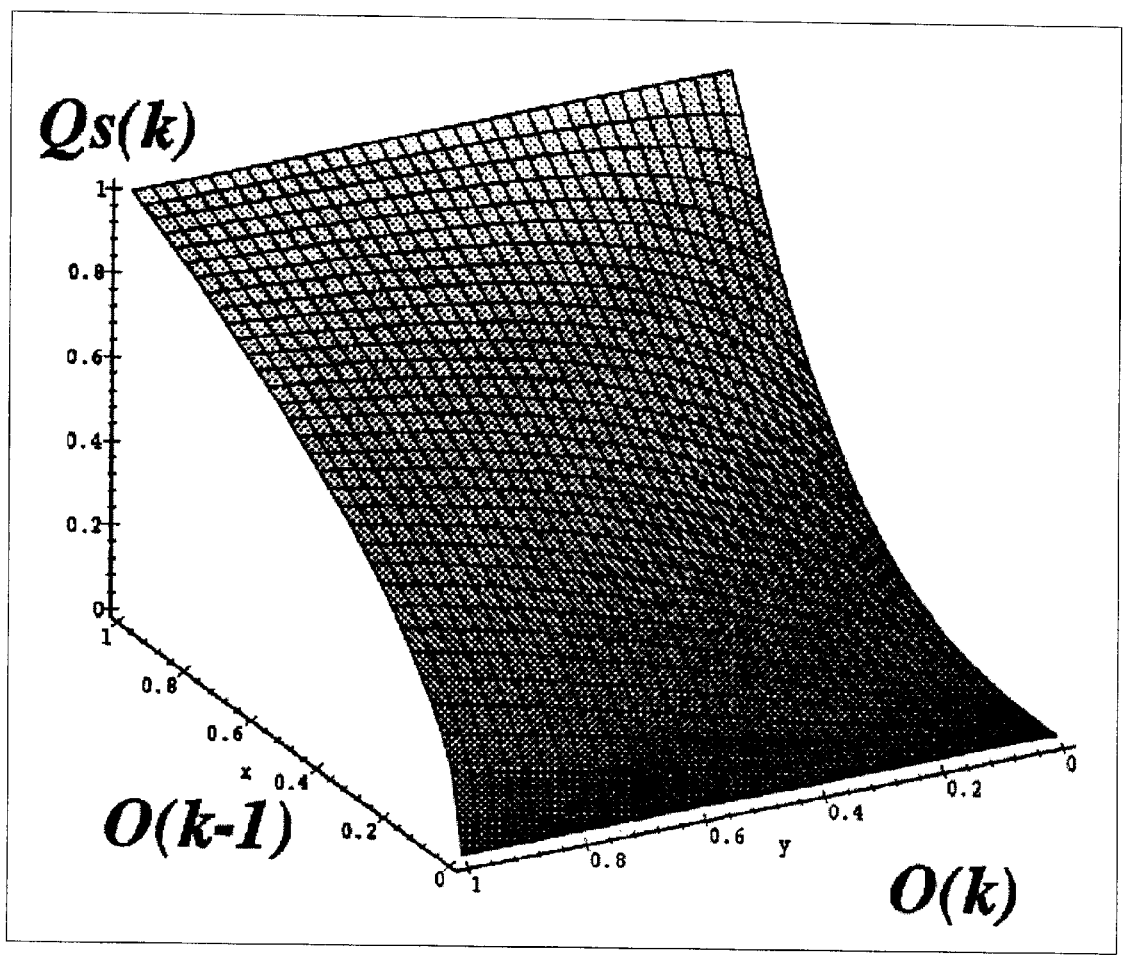
FIG. 4 shows an example of the non-linear mapping curve.

FIG. 4 shows an example of the non-linear mapping curve. The non-linear function for quantisation step size control was modified in an adaptive way. The non-linear surface consists of a combination of an exponential part with a logarithmic part. If the estimated buffer occupancy value O(k) is larger than 0.5, logarithmic part is selected so that steep increase of the buffer occupancy might be prevented. If it is smaller than 0.5, exponential part is selected so that steep decrease of the buffer occupancy might be prevented.

The non-linear surface can be expressed as follows:

$$f(,) = \alpha\left(\frac{1}{\alpha}O(k-1)\right)^{(SO(k)+1)} \times trunc(1 + \alpha - O(k-1)) + \\ \left(1-(1-\alpha)\left(\frac{1}{1-\alpha}(1-O(k-1))\right)\right)^{(SO(k)+1)} \times trunc\left(\frac{O(k-1)}{\alpha}\right) \quad (3)$$

where S is a steepness factor which is represents the extent of non-linearity, and trunk stands for a truncation function to truncate an input to 1 or 0 depending its value. The torsion factor $S_{max}$, which is the maximum value of S, varies with channel rates. There exists an inversely proportional relationship between the factor $S_{max}$ and the channel rate. When the channel rate is high, e.g. 5 Mbits/s, the expanded channel capacity can handle the video rate fluctuation, hence a small $S_{max}$ can be used. For a lower channel rate a higher value is assigned to S to give the surface a larger torsion. α and C are balancing factors which permits the surfaces to adapt a balanced or an unbalanced shape. If α is 0.5, the lower part and the upper part of the sigmoidal surface form a symmetrical sigmoid function as shown in FIG. 4. If $C=S_{max}/2$, both exponential and logarithmic part remain balanced in shape. S ranges from 1 to Smax, 0<O(k-1), and Qs(k)≦1.

The function of the non-linear Qs controller 30 is summarized as below equation (4)

$$Qs(k)=f(O(k-1),O(k)) \quad (4)$$

where f( ) is one of the non-linear mapping surfaces, and the value of quantization step size Qs(k) for the next kth picture frame is determined for given current buffer occupancy O(k-1) and the estimated buffer occupancy O(k).

Figure 5:
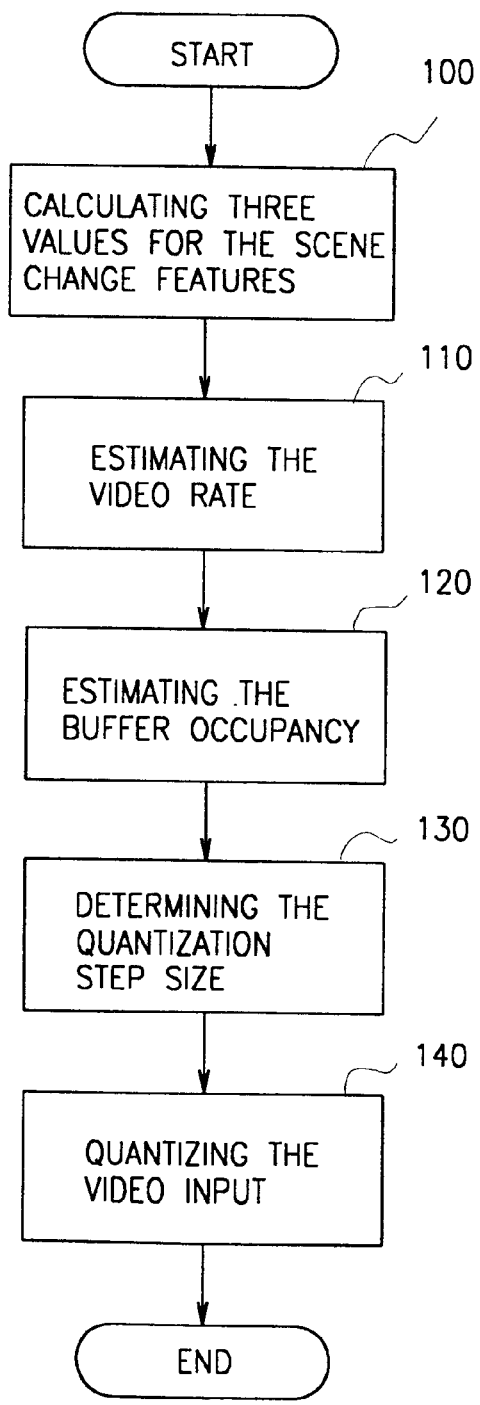
FIG. 5 is a flowchart diagram of the method according to the embodiment of the present invention.

FIG. 5 is a flowchart diagram of the method according to the embodiment of the present invention.

The video rate control method according to the present invention includes a first step of calculating three values for the scene change features for the input video. The three values of the scene change are intra-frame variance, inter-frame variance, and picture type value.

The video rate estimated in the second step by taking the three values of the first step. In the second step, the video rate estimated by the non-linear prediction using a radial basis function(RBF). The estimated video rate will be compared to the actual rate value after completing the encoding of the kth frame.

In the third step of the present invention is a step of estimating the buffer occupancy by the estimated video rate of the second step and current buffer occupancy, and MBF (means bits per frame).

A quantization step size is determined in the fourth step by non-linear mapping curve. In this step, the mapping curve is determined by the current and the estimated buffer occupancy.

In the fifth step, the DCT video input is quantized according to the quantization step size which is determined in the fourth step and encodes a quantized video, thereby output a video rate as a result of the compression.

After completing the encoding the kth frame, video rate of the kth frame cbf(k) is subtracted from the estimated video rate cbfe(k), resulting in an error e(k). The linear weights ω(k) is updated with e(k) in the RLS algorithm to produce the linear weights of the next frame ω*(k+1) in the second step.

As described above, the present invention provides a video rate controlling method for constant bit rate channel and an apparatus therefor. A scene change-based, predictive technique has been applied so that the buffer occupancy may be controlled effectively in advance of encountering a dramatic variation in the video rate. The current buffer occupancy and the estimated future buffer occupancy have been used to control the quantisation step size to provide substantial improvements in the video rate control.

What is claimed is:

1. A method for controlling a video rate for Constant Bit Rate (CBR) video coders, the video rate controlling method comprising:
    (a) calculating three values for scene change features for input video which are intra-frame variance, inter-frame variance, and picture type value;
    (b) estimating a video rate by taking the three values of the scene change features using a Radial Basis Function (RBF); and
    (c) estimating a buffer occupancy by an estimated video rate cbfe(k), a current buffer occupancy O(k−1), and Mean Bits per Frame (MBF), wherein the video rate controlling method comprises,
    (d) determining a quantization step size by a mapping curve of an exponential function type or a logarithmic function type using the current and the estimated buffer occupancy, and
    (e) quantizing a Discrete Cosine Transform (DCT) video input using the quantization step size which is determined in the fourth step and encoding a quantized DCT video input, thereby outputting a video rate as a result of compression, wherein in said step (d), the mapping curve of a logarithmic function type is selected in case the estimated buffer occupancy is larger than a prescribed value, and wherein in said step (d), the mapping curve of an exponential function type is selected in case the estimated buffer occupancy is smaller than a second prescribed value.

2. The video rate controlling method according to claim 1, wherein in step (d), the mapping curve consists of a combination of an exponential function part and a logarithmic function part.

3. The video rate controlling method according to claim 1, wherein the mapping curve of an exponential function type is selected in case the estimated buffer occupancy is smaller than the prescribed value.

4. The video rate controlling method according to claim 1, wherein the prescribed value is 0.5.

5. The video rate controlling method according to claim 1, wherein the mapping curve is a surface which is expressed as below equation;

$$f(;,) = \alpha\left(\frac{1}{\alpha}O(k-1)\right)^{(SO'(k)+1)} \times trunc(1+\alpha-O(k-1)) + \\ \left(1-(1-\alpha)\left(\frac{1}{1-\alpha}(1-O(k-1))\right)\right)^{(SO'(k)+1)} \times trunc\left(\frac{O(k-1)}{\alpha}\right)$$

where S is a steepness factor that represents the extent of non-linearity, trunc stands for a truncation function to truncate an input to 1 or 0 depending its value, and α0 and C are balancing factors that permit the surfaces to adapt a balanced or an unbalanced shape.

6. An apparatus for controlling a video rate for Constant Bit Rate (CBR) video coders, the video rate controlling apparatus comprising:
    scene change calculating means for estimating intra-frame variance, inter-frame variance, and picture type value of an input video;
    video rate estimating means for estimating a video rate of a next frame by taking three scene change features using a Radial Bias Function (RBF); and buffer occupancy estimating means for estimating a buffer occupancy of a next frame using the estimated video rate of said video rate estimating means, the current buffer occupancy, and Mean Bits per Frame (MBF), wherein the video rate controlling apparatus comprises, quantization step size determining means for determining a quantization step size by a mapping curve in the form of an exponential function or a logarithmic function using the estimated buffer occupancy which is outputted from said buffer occupancy estimating means and the current buffer occupancy, and means for quantizing a Discrete Cosine Transform (DCT) video input using the quantization step size which is determined in said quantization step size determining means and for encoding a quantized DCT video input to thereby output a video rate as a result of compression, wherein in said step (d), the mapping curve of a logarithmic function type is selected in case the estimated buffer occupancy is larger than a prescribed value, and wherein in said step (d), the mapping curve of an exponential function type is selected in case the estimated buffer occupancy is smaller than the prescribed value.

7. A method for controlling a video rate for Constant Bit Rate (CBR) video coders, the video rate controlling method comprising:

(a) calculating three values for scene change features for input video which are intra-frame variance, inter-frame variance, and picture type value;

(b) estimating a video rate by taking the three values of the scene change features using a Radial Basis Function (RBF); and (c) estimating a buffer occupancy by an estimated video rate cbfe(k), a current buffer occupancy O(k−1), and Mean Bits per Frame (MBF), wherein the video rate controlling method comprises, (d) determining a quantization step size by a mapping curve of an exponential function type or a logarithmic function type using the current and the estimated buffer occupancy, and (e) quantizing a Discrete Cosine Transform (DCT) video input using the quantization step size which is determined in the fourth step and encoding a quantized DCT video input, thereby outputting a video rate as a result of compression, wherein the mapping curve is a surface which is expressed as below equation;

$$f(,) = a\left(\frac{1}{\alpha}O(k-1)\right)^{(SO'(k)+1)} \times trunc(1 + \alpha - O(k-1)) + \left(1 - (1-\alpha)\left(\frac{1}{1-\alpha}(1 - O(k-1))\right)\right)^{(SO'(k)+1)} \times trunc\left(\frac{O(k-1)}{\alpha}\right)$$

where S is a steepness factor that represents the extent of non-linearity, trunc stands for a truncation function to truncate an input to 1 or 0 depending its value, and α and C are balancing factors that permit the surfaces to adapt a balanced or an unbalanced shape.

* * * * *